(12) United States Patent
Eustice et al.

(10) Patent No.: US 8,892,480 B2
(45) Date of Patent: Nov. 18, 2014

(54) CONTEXTUAL INFORMATION PROVIDER

(71) Applicant: ARO, Inc., Seattle, WA (US)

(72) Inventors: Kevin Francis Eustice, Seattle, WA (US); Alan Linchuan Liu, Seattle, WA (US); Michael Perkowitz, Seattle, WA (US); Andrew F. Hickl, Seattle, WA (US); Paul G. Allen, Mercer Island, WA (US)

(73) Assignee: ARO, Inc., Seattle, WA (US)

( * ) Notice: Subject to any disclaimer, the term of this patent is extended or adjusted under 35 U.S.C. 154(b) by 0 days.

(21) Appl. No.: 13/950,224

(22) Filed: Jul. 24, 2013

(65) Prior Publication Data

US 2014/0032453 A1 Jan. 30, 2014

Related U.S. Application Data

(60) Provisional application No. 61/675,733, filed on Jul. 25, 2012, provisional application No. 61/675,732, filed on Jul. 25, 2012.

(51) Int. Cl.
| | | |
|---|---|---|
| *G06F 15/18* | (2006.01) | |
| *G06F 17/30* | (2006.01) | |
| *H04W 4/20* | (2009.01) | |
| *G06N 99/00* | (2010.01) | |
| *G06N 5/02* | (2006.01) | |
| *H04W 4/02* | (2009.01) | |
| *G06Q 30/06* | (2012.01) | |
| *G06F 17/27* | (2006.01) | |

(52) U.S. Cl.
CPC ........... *H04W 4/02* (2013.01); *G06F 17/30876* (2013.01); *H04W 4/206* (2013.01); *G06N 99/005* (2013.01); *G06N 5/02* (2013.01); *G06Q 30/0631* (2013.01); *G06F 17/2785* (2013.01)
USPC .......................................................... 706/12

(58) Field of Classification Search
None
See application file for complete search history.

(56) References Cited

U.S. PATENT DOCUMENTS

| | | | |
|---|---|---|---|
| 6,655,963 B1 | 12/2003 | Horvitz et al. | |
| 7,251,637 B1 * | 7/2007 | Caid et al. | ......................... 706/15 |
| 7,421,155 B2 | 9/2008 | King et al. | |
| 7,526,458 B2 | 4/2009 | Flinn et al. | |
| 7,702,635 B2 * | 4/2010 | Horvitz et al. | ................. 709/203 |
| 8,224,714 B2 | 7/2012 | Yost | |

(Continued)

OTHER PUBLICATIONS

Adomavicius, G. et al., "Towards the Next Generation of Recommender Systems: A Survey of the State-of-the-Art and Possible Extensions," *IEEE Transactions on KDE*, 2005, pp. 734-749.

(Continued)

*Primary Examiner* — Kakali Chaki
*Assistant Examiner* — Ababacar Seck
(74) *Attorney, Agent, or Firm* — Fenwick & West LLP

(57) ABSTRACT

A user's context history is used to help select contextual information to provide to the user. Context data describing the user's current context is received and a plurality of information items corresponding to the user's current context are identified from a contextual information corpus. A personalized user behavior model for the user is applied to determine the likelihood that each of the identified information items will be of value to the user. One or more of the information items are selected based on the corresponding likelihoods and the selected information items are provided for presentation to the user.

24 Claims, 7 Drawing Sheets

(56) References Cited

U.S. PATENT DOCUMENTS

| | | | |
|---|---|---|---|
| 8,412,665 B2 | 4/2013 | Wang et al. | |
| 8,601,095 B1* | 12/2013 | Carlson et al. | 709/217 |
| 8,606,636 B1 | 12/2013 | Keoshkerian | |
| 8,655,307 B1* | 2/2014 | Walker et al. | 455/405 |
| 2002/0049816 A1* | 4/2002 | Costin et al. | 709/206 |
| 2002/0052934 A1 | 5/2002 | Doherty | |
| 2002/0078204 A1 | 6/2002 | Newell et al. | |
| 2002/0143263 A1 | 10/2002 | Shusterman | |
| 2004/0162830 A1 | 8/2004 | Shirwadkar et al. | |
| 2005/0186965 A1 | 8/2005 | Pagonis et al. | |
| 2006/0026048 A1 | 2/2006 | Kolawa et al. | |
| 2006/0029296 A1 | 2/2006 | King et al. | |
| 2006/0041828 A1 | 2/2006 | King et al. | |
| 2006/0053097 A1 | 3/2006 | King et al. | |
| 2006/0217990 A1 | 9/2006 | Theimer et al. | |
| 2007/0006098 A1 | 1/2007 | Krumm et al. | |
| 2007/0118498 A1 | 5/2007 | Song et al. | |
| 2008/0097820 A1 | 4/2008 | Koran et al. | |
| 2009/0124241 A1 | 5/2009 | Krishnaswamy et al. | |
| 2009/0132905 A1 | 5/2009 | Hoshino | |
| 2009/0216847 A1 | 8/2009 | Krishnaswamy et al. | |
| 2009/0240647 A1 | 9/2009 | Green et al. | |
| 2010/0036643 A1 | 2/2010 | Marvasti et al. | |
| 2010/0070448 A1 | 3/2010 | Omoigui | |
| 2010/0161619 A1 | 6/2010 | Lamere et al. | |
| 2010/0286899 A1 | 11/2010 | Jain et al. | |
| 2010/0332124 A1 | 12/2010 | Bhatt | |
| 2011/0087688 A1 | 4/2011 | Midtun et al. | |
| 2011/0154264 A1 | 6/2011 | Aravamudan et al. | |
| 2012/0030062 A1 | 2/2012 | Stauffer et al. | |
| 2012/0088525 A1 | 4/2012 | Kurokawa et al. | |
| 2012/0117006 A1 | 5/2012 | Sathish | |
| 2012/0123993 A1 | 5/2012 | Wang et al. | |
| 2012/0253548 A1 | 10/2012 | Davidson | |
| 2014/0025660 A1* | 1/2014 | Mohammed et al. | 707/722 |
| 2014/0032208 A1 | 1/2014 | Liu et al. | |
| 2014/0032358 A1 | 1/2014 | Perkowitz et al. | |
| 2014/0032572 A1 | 1/2014 | Eustice et al. | |

OTHER PUBLICATIONS

PCT International Search Report and Written Opinion, PCT Application No. PCT/US2013/051909, Dec. 2, 2013, sixteen pages.

Baltrunas, L. et al., "Towards Time-Dependent Recommendation based on Implicit Feedback," *Workshop on Context-Aware Recommender System (CARS '09)*, Oct. 25, 2009, New York, USA, five pages.

Bellotti, V. et al., "Activity-Based Serendipitous Recommendations with the Magitti Mobile Leisure Guide," *Proceedings of the SIGCHI Conference on Human Factors in Computing Systems, ACM*, Apr. 5-10, 2008, pp. 1157-1166, Florence, Italy.

* cited by examiner

CONTEXTUAL INFORMATION PROVIDER

CROSS-REFERENCE TO RELATED APPLICATION

This application claims the benefit of U.S. Provisional Application No. 61/675,733, filed Jul. 25, 2012, entitled "Recommendation Agents Using Routine, Personality, Learning, and Sharing," and U.S. Provisional Application No. 61/675,732, filed Jul. 25, 2012, entitled "Creating a Storyline from Mobile Device Data," both of which are incorporated herein by reference in their entirety.

BACKGROUND

1. Technical Field

The described embodiments pertain to providing contextual information to a user based on location data and other data collected from mobile devices.

2. Description of Related Art

A variety of information provider systems currently exist. These systems typically identify the user's current location and provide information about that location. The information provided to the user is often independent of the user's identity, and functionality that personalizes the information provided in any way is limited. For example, existing weather and traffic applications will provide information about places the user has previously been, and provide a list of categories of information to which the user can subscribe. The value of such information provider systems is limited by a number of factors.

First, the interests and tastes of a typical user are more nuanced than the general category preferences that existing systems provide. Second, existing systems provide information similar to that which the user has seen before, whereas many users are interested in being presented with new types of information and given options to explore. Third, existing systems consider where a user is, but the information that the user is interested in varies due to many factors other than location. For example, a user who is downtown is likely to have very different interests at 1 pm on a Tuesday afternoon than at 1 am on a Saturday night. Fourth, existing systems are typically limited to providing information based on the user's current location, or a predetermined location. However, in some instances, the user may be more interested in information related to where they will be in future. For example, a user who will be leaving work in three hours needs a projection of traffic for that time, not current traffic; upcoming events, such as a football game or parade, may also affect the projected traffic. Similarly, a user might benefit from a recommendation for a restaurant near his next meeting rather than his current location. As a result, many information provider systems are limited in their usefulness to particular scenarios.

SUMMARY

Embodiments of the invention include a method, a non-transitory computer readable storage medium and a system for providing contextual information to a user that is personalized using a behavior model for the user. The user behavior model for a user can include a routine model, a personality model, and/or additional information indicating the user's interests and preferences.

A context is a (possibly partial) specification of what a user was doing in the dimensions of time, place, and activity. Each of these dimensions may be defined specifically (e.g., location defined by latitude 47.60621, longitude −122.332071) or very generally (e.g., the location "Seattle, Wash."), or entirely unspecified (e.g., omitted or a default value). They may also be ascribed varying degrees of semantic meaning (e.g., "Seattle" contains more semantic information than "47.60621, −122.332071"). A context can represent a stay in a certain location or travel from one place to another. Contexts may have probabilities associated with them. In some cases, contexts may be inferred from evidence rather than known with certainty. Thus, contexts can vary in their specificity, their semantic content, and their likelihood.

Embodiments of the method comprise receiving contextual data indicating the current context of a user and identifying a plurality of information items in a corpus based on the current (or a predicted) context. The method further comprises determining the likelihood of each of the plurality of information items being of value to the user and selecting one of the information items for presentation based on those likelihoods. In one embodiment, the user behavior model is updated based on the user's response to being presented with the selected information item.

Embodiments of the computer-readable storage medium store computer-executable instructions for performing the steps described above. Embodiments of the system further comprise a processor for executing such computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide contextual information to a user based on the user's routine and/or metrics describing the user's personality/interests, as determined from context slices generated from observed data. A context is a (possibly partial) specification of what a user was doing in the dimensions of time, place, and activity. Contexts can vary in their specificity, their semantic content, and their likelihood. Raw context data can be collected from a variety of observation sources with various error characteristics. Slicing refines the chaotic collection of contexts produced by data collection into consistent segments, called slices, each with a corresponding set of contexts. Accordingly, the slices and corresponding context data are then available for further processing, such as determining information to provide to the user based on the user's current (or a predicted) context.

System Overview

Figure 1:
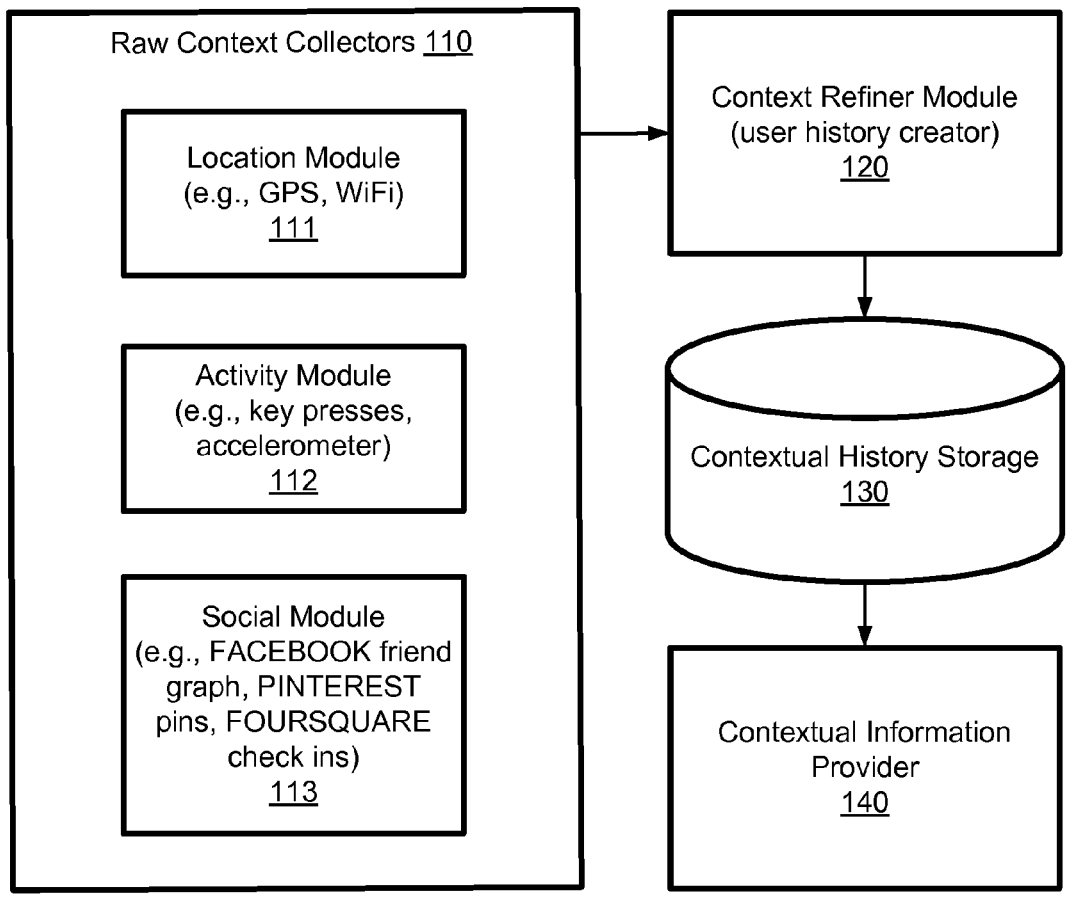
FIG. 1 is a block diagram illustrating a system environment for providing contextual information to a user in accordance with an embodiment of the invention.

FIG. 1 is a block diagram illustrating a system environment 100 for providing contextual information to a user, in accordance with an embodiment of the invention. The system environment 100 includes one or more raw context collectors 110, a context refiner module 120, contextual history storage 130, and a contextual information provider 140. In one embodiment, the entities of the system environment 100 may be contained on a single processing node, such as a user's mobile device, and in another embodiment, the entities of the system environment may be divided between the user's mobile device and a centralized processing node to decrease the processing requirements of the mobile device. An example distributed embodiment is one where the raw context collectors 111 are located on the user's mobile device and data is sent to a central device for context refinement, storage, and use in the selection of pertinent contextual information to present to the user.

The raw context collectors 110 collect raw context data from observation sources, sensors, monitors, third party sources, and the like. A raw context represents a single observation and so is generally very specific, often carries little semantic information on its own, and is of high probability. Naturally, different observation sources may have greater degrees of noise and uncertainty or may inherently include semantic information. In the example illustrated in FIG. 1, the raw context collectors 110 include a location module 111, an activity module 112, and a social module 113, but different and/or other context collectors 110 may be included in other embodiments. For example, in various embodiments, the context collectors include sensors for measuring device orientation (e.g., a compass), magnetic fields, user heart rate, and user stress level, as well as modules for audio and visual sampling of the user's environment.

Examples of location module 111 include a GPS receiver, and a WiFi receiver that enable the location module 111 to determine an absolute or relative location of the user's mobile device, within a margin of error. Examples of the activity module 112 include, a monitor of key presses that determines when a user is typing or otherwise interacting with the user's mobile device, and an accelerometer that measures the acceleration forces on the mobile device to determine movement and movement patterns of the mobile device. Examples of social module 113 include a FACEBOOK friend graph, PINTEREST pins, FOURSQUARE check ins, and other social media data that identify a user's social acquaintances, activities, and locations.

The context refiner module 120 receives the raw context data from the raw context collectors 110. The context refiner module 120 groups the context data by combining the observations into slices in order to create a more coherent representation of the user's context during the time range represented by the slice. Each slice includes one or more contexts that apply to the user for the time range corresponding to the slice. The context refiner module 120 may also attach semantic content to a slice or sequence of slices to provide additional contextual information, such as an activity that the slice or slices represent, general locations like a city or neighborhood, specific business locations, the time of day, or the day of the week. In some embodiments, the context refiner module 120 includes a plurality of context refiner sub-modules (not shown); one for each type of context data received from the raw context collectors 110. Each context refiner sub-module groups context data by combining the observations from the corresponding raw context collector 110 into slices in order to create a more coherent representation of the user's context indicated by the specific type of context data the sub-module is operating on. In one such embodiment, the context refiner module 120 includes an additional refiner sub-module (not shown) that analyzes the multiple streams of contexts generated by the other context refiner sub-modules to detect overlapping slices and generate combined slices containing context information from the corresponding overlapping slices.

The contextual history storage 130 receives the slices formed by the context refiner module 120 from a user's raw contextual data and stores them in association with an identifier of the user. Thus, the contextual history storage 130 contains a collection of slices that collectively describe the user's contextual history. This collection may consist of multiple parallel streams of contextual information as well as a single master stream composing all these contexts together. The contextual information provider 140 can then access the stored slices in order to select contextual information to be presented in a manner that is customized for the user. The processes of creating slices and building customized recommendation agents will be described in detail in the sections below.

Figure 2:
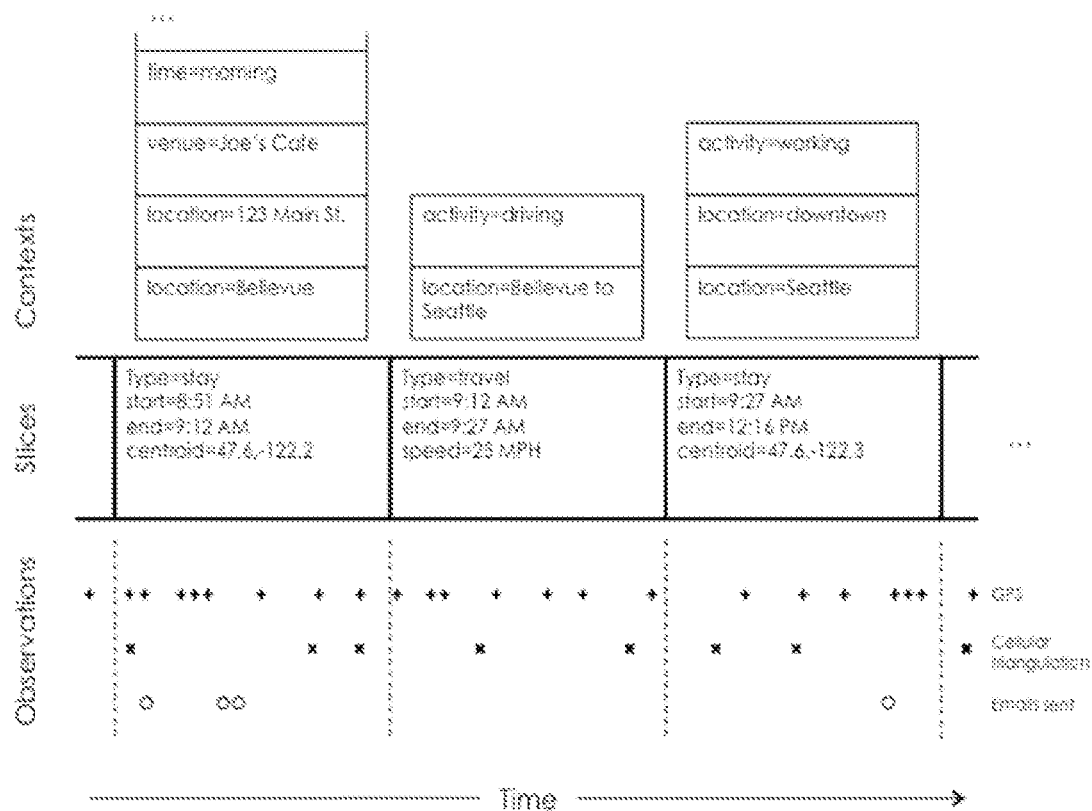
FIG. 2 is a diagram illustrating the relationship of sensor data, slices, and contexts in accordance with an embodiment of the invention.

FIG. 2 is a diagram illustrating the relationship of sensor data, slices, and contexts, in accordance with an embodiment of the invention. FIG. 2 illustrates observations, which are the collections of sensor data from a mobile device. In this example, the observations include Global Positioning System readings, Cellular triangulation signals, and emails sent from the device. The points along the time axis at which these observations are collected are marked. As a result of these observations, the user's time can be divided into a sequence of slices. In this example, each slice has a type and a start and end time. In this example, the type is either "stay" or "travel" and the start and end times establish the limits or boundaries of the slice. For "stay" type slices, the slice also has a centroid location, and for "travel" type slices, the slice also has a speed of the travel. In this example, based on the division of observations into time slices, a variety of metadata representing contexts have been attached to the slices. The metadata may describe the dimensions of time, place, and activity of the user at various levels of generality. For example, the first slice is associated with a place dimension of the context at various levels of generality/specificity: at a city level, a street address level, and a venue level.

Contextual History Creation Process

Figure 3:
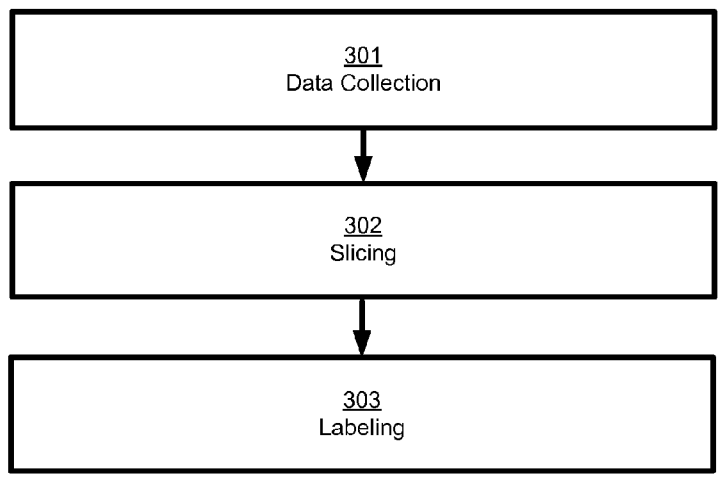
FIG. 3 is a flow chart illustrating a process of creating and updating a user's contextual history in accordance with an embodiment of the invention.

Embodiments of the invention divide the process of the creation and updating of a user's contextual history into three phases: data collection, slicing, and labeling. These phases are illustrated in the flow chart of FIG. 3, and described in detail in this section.

Data Collection 301

Data collection 301 involves accessing the various sources of information and observations of user behavior, optionally transporting their data to servers for analysis and storage (to offload CPU load and reduce battery usage), and translating the data into a collection of raw contexts for additional analysis. These observations may come from a variety of sources, including but not limited to the following:

- Location technologies (e.g., GPS, cell tower triangulation, WiFi location), typically embedded in mobile devices like smartphones. The location technologies may be included, for example, in the location module 111.
- Activity data such as accelerometer data from mobile devices and device interaction notices (e.g. taps, key presses, power on). The activity data may be collected, for example, by the activity module 112.
- Ambient data from the user's environment (e.g., sound, temperature, or light intensity).
- Biometric data such as the user's skin temperature, galvanic skin response, heat flux, and heart rate. This data may be used to calculate caloric burn, stress level, sleep quality, and other indicators of the user's physical state.
- Social data from any networks or applications the user may use, such as FACEBOOK, TWITTER, FOURSQUARE, FLICKR, or PINTEREST, as well as personal communication applications like email and text messaging. The social data may be collected, for example, by the social module 113. In one embodiment, the social data is made available to the social module 113 through application programming interfaces (APIs).
- Schedule data, such as from the user's calendar application.
- Explicit annotation created by the user to inform the system of a location (e.g., a "check in" at a baseball stadium) or activity (e.g., marking the time boundaries of a jog to track fitness goals).

Data collection 301 may be run as a constant on-going process, with different techniques appropriate to different sources. Alternatively, data collection 301 may be run periodically at an interval appropriate for the application.

Slicing 302

One challenge with data collection 301 is that multiple sources of observation data may result in a collection of contexts that contain conflicting information. For example, an observation from the user's calendar may place him at a meeting downtown, while GPS observations may show him to be at the beach. Resolving these inconsistencies is key to the interpretation of the data. Slicing 302 is the process of refining the chaotic, multi-threaded collection of raw contexts produced by data collection into consistent segments, called slices, each comprising a set of one or more contexts. For example, in the case of location data such as that from GPS sensors, these slices generally represent either a stay at one place or a process of travel from one place to another. In one embodiment, place information may be refined, in that each stay context defines an area that includes most of the individual points observed during that time. Travel contexts will generally have a start and end point, with some definition of the route between them (e.g., waypoints). In another embodiment, no additional semantic meaning or activity information is added during slicing 302. Other types of data can be used to produce other types of slices, such as slices representing a period of consistent activity. For example, an activity like "shopping" may be represented by a longer-duration slice that overlaps with multiple location slices representing stays at different retail businesses as well as travel between those businesses. Conversely, an activity like "sleeping" may span only part of a stay at home. As another example, a biometric slice such as "high caloric burn" may cover part of a visit to the park as well as time at the gym.

Figure 4:
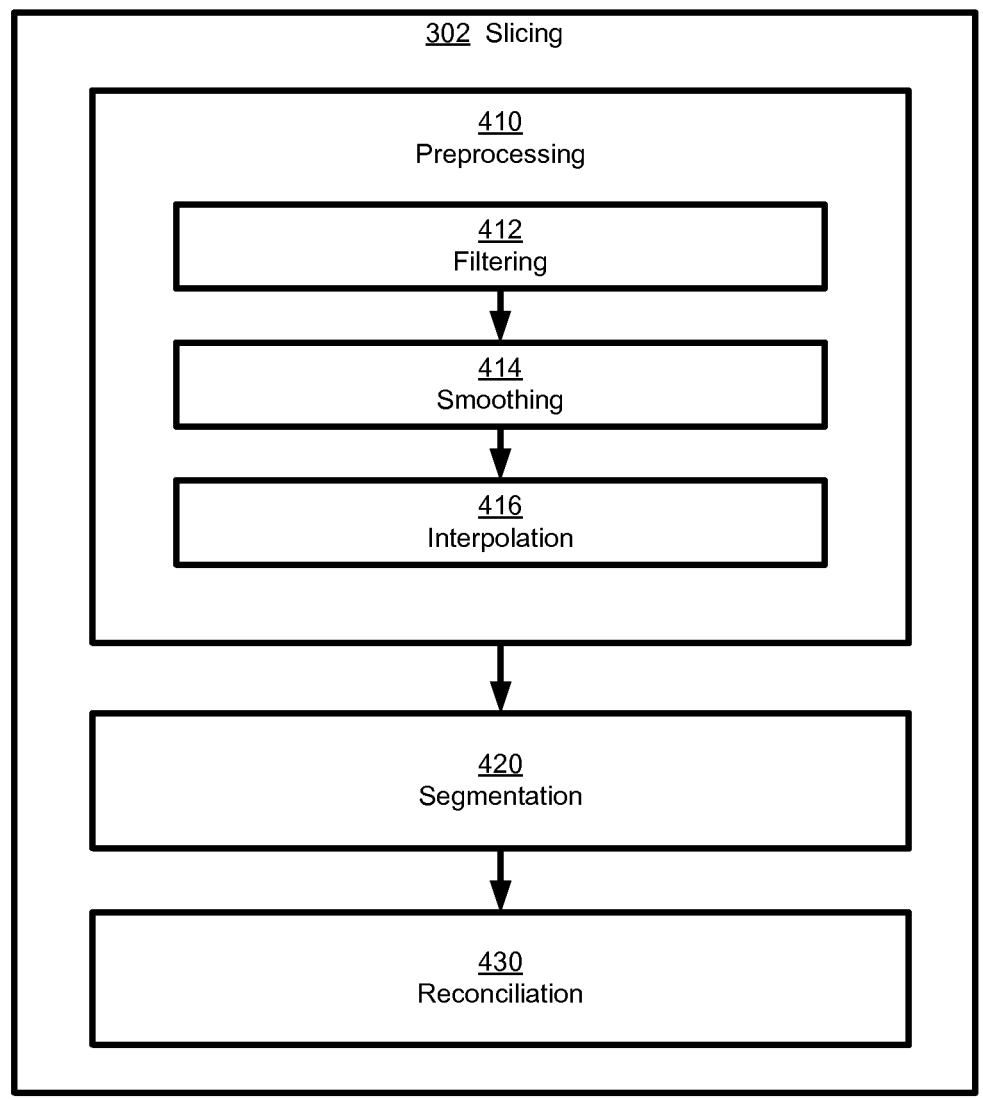
FIG. 4 is a flow chart illustrating a process of slicing in accordance with an embodiment of the invention.

Embodiments of the invention divide the process of slicing 302 into three phases: preprocessing 410, segmentation 420, and reconciliation 430. Each of these phases is described in detail in this section, with reference to the flow chart illustrated in FIG. 4. The steps of FIG. 4 are illustrated from the perspective of the context refiner module 120 performing the method. However, some or all of the steps may be performed by other entities and/or components. In addition, some embodiments may perform the steps in parallel, perform the steps in different orders, or perform different steps.

Preprocessing 410

Since raw context data input into the slicing 302 process come from a variety of sources with varying degrees of inaccuracy, the raw context data are systematically groomed into a suitable form for later steps to minimize the amount of error in the output. In one embodiment, preprocessing 410 involves a combination of filtering 412, smoothing 414, and interpolation 416.

Filtering 412.

Filters on raw context data eliminate from consideration raw context data that are deemed more inaccurate than some desirable threshold. The value of the filter threshold can be sensor-specific, due to different sensor error characteristics. For example, a GPS device's data uncertainty is calculated by physical factors related to the timing of signals received from the device's acquired satellites, so it can report a reliable estimate of sensor inaccuracy. In contrast, reported uncertainty is less reliable with location technology based on cell tower or WiFi triangulation, which lack the measurement precision necessary to account for fluctuations in wireless signal strength, therefore the threshold for filtering 412 those contexts may be higher. When using any location technology, the amount of filtering 412 will depend on its expected error characteristics, and the error characteristics are expected to vary between sources of data. Optionally, default threshold values for filters may be set system-wide, set per sensor type, or based on user preferences. In addition to filtering 412 by location technology, physically unlikely readings (e.g., traveling at higher speeds than possible) may also be filtered.

Smoothing 414.

It is also helpful to later slicing phases for context grooming to smooth sequences of contexts from the same sensor when each individual context is noisy. Noise characteristics are hardware dependent, so the smoothing 414 of each sensor should be parameterized to limit the noise expected from that sensor. For example, a certain accelerometer may generate noisy contexts at a high sampling rate, characterized by large magnitude swings in all axes. One way to smooth such data is to compute an average of the magnitude values over a time window and then output the smoothed magnitude values at a less frequent sampling rate. Smoothing 414 is also used when different sensors conflict. For example, if there is minimal change in values across a series of accelerometer readings, it indicates that a device was immobile, which could contradict a series of location readings that would otherwise suggest the device was wandering due to inaccurate location technology. In general, the degree of smoothing 414 will depend on the variability in data noise from each particular location technology.

Interpolation 416.

Uneven sampling rates can also be due to power conservation, where a device chooses to go into a low-power, low sampling rate state, or is forced to by a governing operating system such as a mobile phone OS. It is common for sensors to be configured to increase sampling when the environment is changing, and to decrease it when the environment (from the sensor's perspective) is static. As slicing 302 occurs over a finite window of time, a decreased sampling rate could lead to relevant context data falling outside the window. Therefore, it is desirable in some cases to interpolate less frequent context data to ensure that the later phases of slicing 302 have sufficient data to analyze. Interpolation 416 generates virtual context data between sensed context data. For example, when there is a gap between two location contexts, a number of interpolated context data points may be generated that correspond to locations between the two endpoints. Interpolation 416 runs into the risk of adding contexts that should not exist. For example, if a sensor is not functional and therefore not reporting, a gap in contexts should not be interpolated. To prevent invalid interpolation 416, sensor data payload may include an indication that there has been an interruption in contexts since the last time a sensor generated context. This may be the default behavior whenever a sensor is (re)started for data collection by the controlling data collection process. In addition, if there is an exceptionally long gap between context data from sensors, it may indicate an interruption even if the sensors fail to set the flag and would be treated as such.

Segmentation 420

Segmentation 420 involves determining distinct, contiguous series of slices from the groomed sensor data representing different activities. For example, the simple day of a user who is an office worker could be segmented into a stay slice located in the morning at her domicile, then a commute to work travel slice, a stay slice at an office, then a commute back home travel slice, followed by a stay slice in the evening at her domicile.

There are a variety of algorithms to segment the input raw context data into stays, travels, and gaps. For example, k-means clustering can be applied to find clusters of contexts (by location, or a distance function combining location and time). Stay slices can be distinguished from travel slices by the dispersion of location context and/or velocity data. Because k-means has fundamental limitations, other more sophisticated clustering algorithms can be used additionally or alternatively to extract slices.

Besides clustering, segmentation 420 can also be performed by applying time-series analysis algorithms, using the variance of a sliding window of input contexts to detect inflection points in the distribution. When the variation across a subsequence of input context data differs from a subsequence before it, the algorithm divides the two subsequences into slices that can then be classified as a stay or travel. For example, a stay is distinguishable from a travel by the low amount of variance in each individual input context in the stay sequence to its centroid, the geographic average location.

Because there are a variety of algorithms that can be applied to segmentation 320, each with different features and limitations, it is also possible to combine their resulting outputs with a meta-segmenter. This meta-segmenter can pick and choose slices output with the highest associated probability among all constituent segmentation algorithms.

Segmentation 420 can also be followed by filter and merge steps that smooth the output slices. Filters can remove short slices with more uncertainty associated with the contexts included therein, e.g., those with few actual sensor observations, and merge adjacent segments that are likely to be the same activity. The thresholds on minimum required observation uncertainty or distance from adjacent segments for filtering and merging can be parameterized to control the false positive rate (groups of raw context data that should not have been segmented) compared to the false negative rate (groups of raw context data that should have been segmented but were not).

Reconciliation 430

In one embodiment, the final phase of slicing 302 deals with resolving newly generated slices with existing contexts generated from a previous slicing 302 run. While this reconciliation is optional—if it were computationally feasible to run slicing 302 on an entire raw context set, the brand new contexts could simply replace the older ones—in some cases reconciliation provides desirable qualities for the purpose of presentation. For example, it is desirable not to change contexts and slices in a user's history that have been previously displayed to the user, unless new data is in significant conflict, because the instability in data shown to the user would appear inconsistent. Instability is even less desirable in cases when the user has performed some operation on a previous context or slice, such as manually labeling or otherwise attaching metadata to it, that the subsequent slicing 302 run would overwrite. As such, there are rules governing when new slices and contexts can replace preexisting data in a user's history.

One way to limit the scope of changes between new and preexisting slices is to specify a time window within which preexisting data may be changed or replaced. Any data outside the window (i.e., older than a certain age), would be left unchanged in later slicing 302 runs. Contexts from newer slices are then integrated into the eligible preexisting slices by comparing type (stay or travel) and time spans. If a new slice is of the same type and begins and ends at approximately the same time as an existing slice, it could retain the same metadata of the existing slice, including any identifier labels (ids) and contexts. When a new slice and old slice overlap in time but conflict in type, the process can prefer the new slice except when there has been manual intervention, for example when a user has already interacted with the existing slice or confirmed it in some way using a user interface. Finally, the last slice is most likely to have changed due to new data, and could have its ending time extended if it aligns with a new slice starting at a time near its own start time, or completely replaced if the type changed (if a previously presumed stay were actually the beginning of a travel slice, for instance).

Labeling 303

Labeling 303 is the process of adding more specific and semantically meaningful data to the slices produced by slicing 302. In one embodiment, some or all of these labels are themselves contexts associated with the slices. In particular, labeling 303 adds geography (such as a slices's city or neighborhood), venue (public places, businesses, or personally significant places like "home"), and activity (such as "working", "eating", or "going to see a movie"). Note that the process of labeling 303 may suggest a revision in slicing 302, such as when the labeling 303 process determines that a user was eating and then seeing a movie at the theater next door, while the slicing 302 phase represented both activities as a single slice, prompting the single slice to be split into two successive slices, taking place at distinct venues.

A slice can be labeled using identifiers from predefined data sets, such as public venue records, or automatically generated, for example using a reverse geocoding system that converts latitude and longitude coordinates into an approximate street address. The labeling 303 process uses these data sources to apply probable labels to each slice. Some labels are exclusive while others may coexist alongside one another. Example data sources for the labeling 303 process include:

Public venue database—a set of geographically annotated public venue names, such as businesses, public spaces, or landmarks. The venue data should be able to be queried geographically (e.g., to find likely venues within some specified distance of the slice's observed location observations), therefore it should have a location represented either as a single point (latitude, longitude, altitude) or as a set of points that defines or approximates its shape. The venue may also contain a unique identifier, which is useful, for example, to use to associate the venue with manually entered observations from the user. In addition to location and name, the data entry for the venue may contain other metadata such as address, business hours, categories describing the type of venue, and reviews useful to present back to the user. Because the set of public venues changes over time, this database may be configured to receive updates whenever available.

User-specified database of places—a set of manually or automatically generated locations considered private to the user, identified by location and optionally by name and other metadata the user chooses to attach. The purpose of this database is to provide labels for slices that cannot be associated with public venues due to gaps in coverage. For example, many homes are not public venues and therefore would not be found in any public venue database, so a user may need to manually label his/her home. Labels such as "home" and "work" can also be automatically inferred.

A set of additional labels associated with certain venue metadata such as a venue category. These labels could include descriptions of activities commonly applicable to the venue category (e.g., "jogging" at public parks or "dining out" at restaurants). These labels may be either predefined or automatically extracted, e.g., by analyzing the texts of some corpora such as online reviews. As with venue or place, the user can manually apply an activity label to a slice, or the labeling 303 process can infer it based on a model of likelihood given the input context.

Public and user-specific calendar data—listings of public events and private appointments that can then be applied to matching, consistent slices.

A database to store user corrections to automatically applied labels that were made by the system in error. This database has multiple uses. First, in the case of continuous slicing 302 and labeling 303, the correct label can be used during reconciliation 430 to prevent incorrect labels from being reapplied. Second, the presence of the correction indicates with high confidence what the correct description for the slice is, and can influence future automated labeling 303 decisions for similar slices. The user corrections may be stored, for example, in contextual history storage 130 or similar data store accessible by the context refiner module 120.

Figure 5:
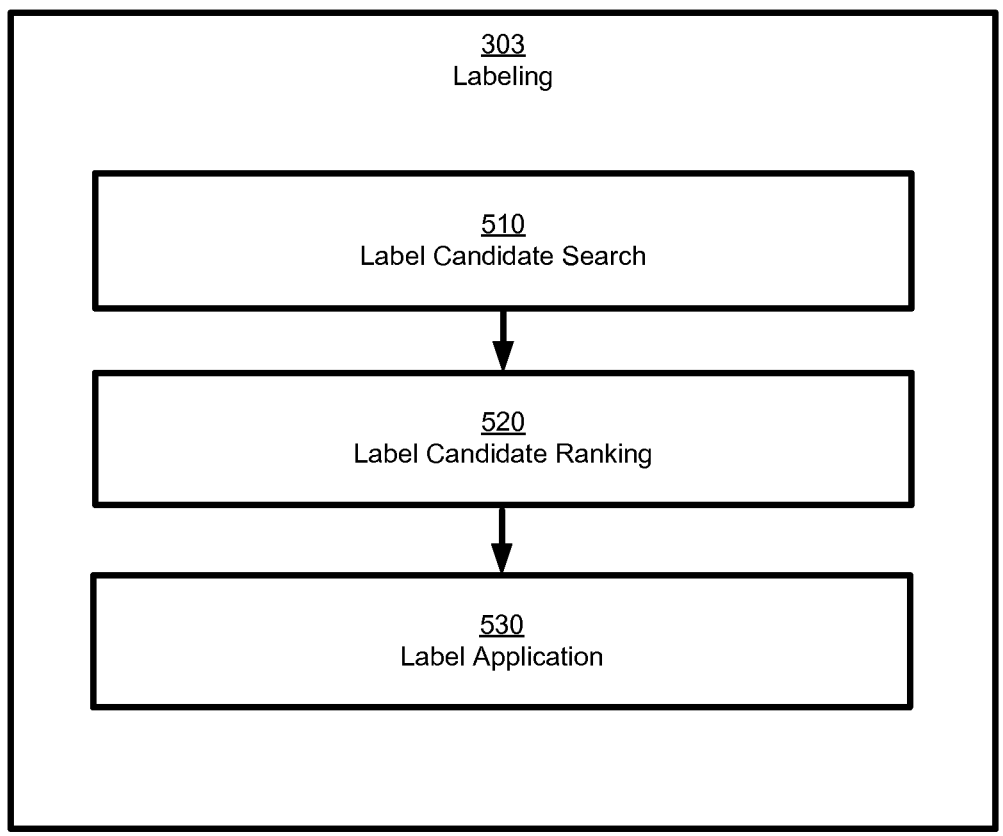
FIG. 5 is a flow chart illustrating a process of labeling in accordance with an embodiment of the invention.

Conceptually, it is possible to view the labeling 303 process as a collection of subprocesses responsible for outputting one type of label at a time. Labels of different types can then be run simultaneously on slices, or chained when one type of label is triggered by the presence of another (i.e., activities that are category- or venue-specific are only considered when a preceding labeling 303 subprocess applies a corresponding category or venue label, respectively, to the slice). In general, the labeling 303 process can be broken into three phases: label candidate search 510, label candidate ranking 520, and label application 530, as illustrated in FIG. 5.

Label Candidate Search 510

In the label candidate search 510 phase, the label sources are first queried to discover possible labels based on the slice's existing contexts. The following provides examples of how various label types can be searched.

Venues and places are found based on the slice's location, which by definition is a consistent estimate of a user's location over a period of time. However, there is a degree of uncertainty when using the associated slice location. Essentially, raw sensors providing locations are imprecise. The label candidate search 510 phase does not rely on the exact location represented by the slice, but instead expands the search within some radius calculated as an estimate of the uncertainty. For example, if a slice's location was calculated using WiFi triangulation, the triangulation error is often in the tens to low hundreds of meters, so the search process may query for venues and places centered at the slice location within two hundred meters.

Events and appointments can be found based on the slice's location and time boundaries. An event at a venue would be matched against the overlapping time boundaries between the event and the slice. Appointments are also matched against location and time. Because event and appointment time boundaries are imprecise, and slice time boundaries may be imperfect, the slice's time boundaries do not need to exactly match those of an event or appointment. Similarly, the slice location does not need to be an exact match either. The label candidate search 510 finds possible events and appointments within the likely uncertainty radius of the slice location.

Several methods may also be used to find candidate activities. For example, based on the category and/or venue labels already applied to the slice, the label candidate search 510 process can bring up associated activity labels. As another example, the slice context can be compared to similar slices in the past if the user had previously labeled activities manually. For example, if a user previously labeled an activity at the same venue or a venue in the same category as the slice that has not yet been labeled with an activity, that activity would be considered as a candidate for labeling the slice.

Label Candidate Ranking 520

Once a set of label candidates of a given type are found, the likelihood of each one given the contexts already associated with the slice is evaluated. In one embodiment, the likelihood of each label is computed and the labels are ranked. There may also be a threshold for likelihoods, such that if no label is deemed likely enough, none is applied to the slice at all—this avoids the case of having a label (e.g., an incomplete label) applied inappropriately. In one implementation, slices are constrained to only having one label of some types (e.g., venue labels), and the top-ranked label meeting the minimum likelihood threshold is applied to the slice. For other label types, multiple labels can be valid for a single slice, and all labels meeting the minimum threshold of likeliness are applied.

Likelihoods are calculated by scoring a candidate label given the contexts already associated with a slice. A model is defined to be an algorithm for computing likelihoods given slice context. Models treat the various aspects of a slice context as features. Some example features include:

Slice location—while the label candidate search 510 also uses location to discover the set of eligible labels to apply, a ranking model can further determine the likelihood of a label given its distance to the slice location, or relative likelihood between several candidates (e.g., a venue that is significantly farther from the slice location would to considered less likely, but two venues that differ only a small amount in distance from the slice location may be considered equally likely given the location context, all else being equal).

The particular user whose slice is being labeled—since users have individual differences, a model may use specific algorithms tailored to each to achieve the best labeling accuracy. One example of how an individual user could affect label candidate ranking 520 is for the ranking process to use the user's accumulated history of slices and labels, some of which the user may have explicitly confirmed to be accurate. Labels that occurred more often in the user's history may be considered more likely when labeling new contexts.

The beginning and end stay times—since different labels are more likely to occur at different times (e.g., restaurants at meal times, rock concerts in the evenings), and events, appointments and activities last for different lengths of time (e.g., movies between 1.5-3 hours), the likelihood of a particular label can depend on the corresponding day and time range.

Besides the context provided by the slice, models can use other sources of information to inform the likelihood estimate. Some example information sources include:

Venue hours of operation—can be used to reduce the likelihood that a venue be applied to a slice when the venue is known to be closed during some significant portion of the slice's time boundaries.

Venue popularity—e.g., relative popularity over all time compared to other venues, or historic popularity at the time of day, day of week, etc, which can indicate the likelihood that the label is applicable given the slice's time boundaries. If the duration of the slice is known, it can also be compared to the distribution of stay durations at the venue to determine whether the length of time spent in one place is consistent with other visits to the candidate venue.

Category popularity—can be used when data is scarce about specific venues in the candidate list. This can also be relative to time of day, day of week, etc., and can also include typical stay durations so that the slice's time boundaries factor into the likelihood calculation.

Routine—considering how often in the past the user has similar slices with the candidate label, can determine whether a certain label is more likely (if there are many such instances) or less likely (if there are few or no instances). Routine is not limited to only considering a specific user's historical patterns. Users can be clustered into cohort groups, or even aggregated into a global routine model, depending on data scarcity due to limited interactions with the system or the area where the slice occurs. Methods for determining a user's routine are discussed in greater detail below, with reference to FIG. 6.

Social interest—some users are more likely to visit a venue if their friends recommended it, if they have been there before, or were labeled as being there during an overlapping time period by the labeling 303 process. Some of this information is available through existing social network APIs, for example recommendations may be based off of a friend "liking" the venue on FACEBOOK. Information about a user's friends visits to a venue can also come from a friend "checking in" or retrieved from the contextual history storage 130 (in embodiments where the contextual history storage is centralized).

Label Application 530

One or more models can be run to process a slice's context(s) into labels, which are applied in label application 530. Conceptually, multiple models can be represented by a single meta-model that runs the appropriate features through its composing models. Once the meta-model outputs probabilities, labels deemed sufficiently likely are applied to the slice. In one embodiment, labels that are not deemed to be sufficiently likely can still be surfaced as options to the user should he/she wish to alter the label set by adding new labels, with the label candidate ranking 520 intact. In such cases, it is not necessary for the same meta-model to produce the label candidate ranking 520—different meta-models can rank labels differently to produce whatever is specified by the system design of a particular embodiment.

In one embodiment, automatic label application 530 does not require that every label is ranked solely by likelihood. For example, when users interact with the label candidates (e.g., to manually apply labels), it can be desirable to present candidate labels in different orders to make finding desired labels easier. For example, an alphabetical order or a hybrid order that incorporates both likelihoods and lexicographical positions can be used. Once labels are applied to slices, the additional contextual data is presentable to the user and available for further processing in a variety of forms.

Building Behavioral Models

A user's history can be used to build models that describe the user's personality and/or routine. These models can then be used by a contextual information provider 140 to select information for presentation that is both relevant to the user's current (or a predicted) context and customized based on the user's routine and/or personality. Additional data about the user and/or the pieces of information that are considered for presentation can also be used in selecting what contextual information to present. In various embodiments, the contextual information provider 140 select contextual information to provide based on pre-built models for the user. In some embodiments, the contextual information provider 140 also updates the models based on feedback describing how the user responded the presented information.

Figure 6:
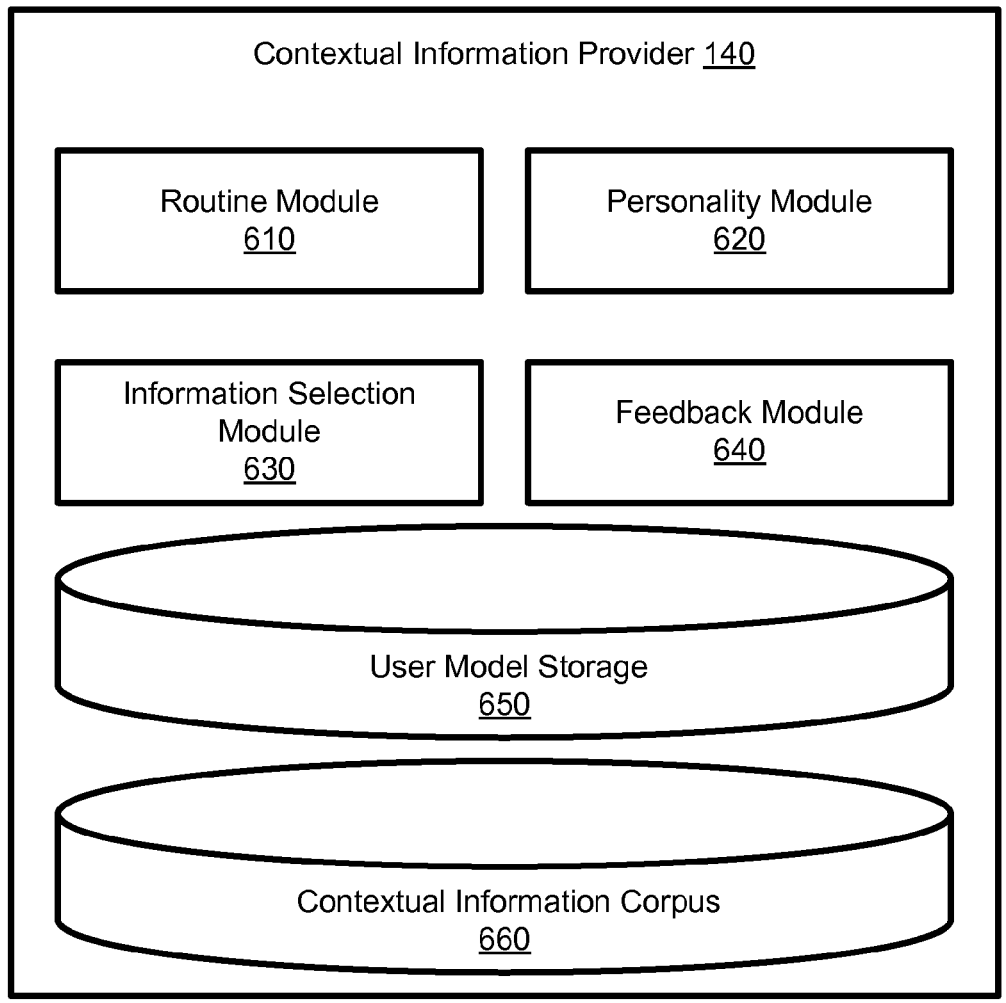
FIG. 6 is a block diagram illustrating one embodiment of the contextual information provider shown in FIG. 1.

FIG. 6 is a block diagram illustrating one embodiment of a contextual information provider 140. The illustrated contextual information provider 140 includes a routine module 610, a personality module 620, an information selection module 630, a feedback module 640, user model storage 650, and a contextual information corpus 660. In other embodiments, the contextual information provider 140 contains different and/or additional elements. In addition, the functions may be distributed among the elements in a different manner than described herein.

The contextual information corpus 660 comprises a plurality of information items that may be presented to users and corresponding metadata (e.g., a type of the information item, times when the information item is appropriate, types of personality that are likely to respond positively to the information item, and the like). The routine module 610 and personality module 620 generate models of a user's routine and personality respectively, based on the corresponding user history stored in contextual history storage 130. The generated models are stored in the user model storage 650. A user's routine and personality models are generally described herein as separate entities, but in some embodiments, the user model storage 650 includes a single model for each user describing aspects of the user's routine and personality.

The information selection module 630 selects information items from the contextual information corpus 660 to present to a user based on the user's routine and/or personality model. In some embodiments, the information item selection is further based on additional information about the user that is available to the information selection module 140. The feedback module 640 gathers feedback regarding the user's response to provided information items and uses the feedback to improve future information item selection. For example, in one embodiment, the feedback module 640 updates the user's personality model based on the received feedback.

The information items in the contextual information corpus 660 can be compiled from various existing sources. Although FIG. 6 shows the contextual information corpus 660 to be a single component in some embodiments the corpus is distributed across a plurality of computing devices.

In one embodiment, some or all of the information items are accessed remotely from third party services (e.g., using an API) but are considered to be part of the contextual information corpus 660. For example, FOURSQUARE provides a database of user generated tips that is publicly accessible via an API, which may be incorporated into the information corpus 660. As another example, TOMTOM provides an API giving public access to data regarding traffic incidents and conditions. In some embodiments, the contextual information provider 140 generates and maintains some or all of the information items in the corpus 660 itself. For example, when visiting Paris, a tourist may provide information regarding a day and time when the line for the Eiffel Tower is likely to be short, which is then added to the corpus 660. Other examples of information sources include weather, event schedules, information about businesses (e.g., menus for restaurants, screening schedules for movie theaters), ratings and reviews of businesses, nearby friends, hours of operation of businesses, special events and offers from businesses, public alerts and warnings (e.g., a storm warning or traffic disruption for the area), upcoming meetings and calendar events, task and to-do list reminders (e.g., "get milk" is on a to-do list and the user is near a store), activity notifications (e.g., the user has been exercising non-stop for a long time and is over-exerting himself), and reminders (e.g., the user has not been observed exercising for an extended period of time, or the user's contextual history indicates he has travelled a long distance since last stopping at a gas station and he should stop to get gas).

Modeling User Routine

The routine module 610 takes a user's history comprising slices as input and generates a model describing the user's routine. The routine model describes correlations between contexts for the user that can be used to predict what information items are likely to be of interest to the user based on the user's current contexts. For example, if a user regularly leaves work to get lunch at midday and leaves to go home at 5 P.M., the routine model could indicate a first correlation between the contexts "midday" and "lunch" and a second correlation between the contexts "5 pm." and "travel from work to home." Thus, the contextual information provider 140 might provide information regarding daily specials at restaurants near the user's work at 11 am and traffic information for the user's route home at 4 pm. The routine model can also be used to predict likely future contexts based on the current context and/or the user's general routine. For example, the routine model may encapsulate the knowledge that the user generally heads home at around 6 pm, regardless of where he is at that time. Thus, the routine model can be used to predict that the user is likely to find value in traffic information for the route between his current location and home at 6 pm. As another example, the routine model may encapsulate the knowledge that the user often follows a visit to a gym with a visit to a juice bar, regardless of time of day. Thus, when the user is observed to be at a gym, the routine model can be used to predict that opening times and menus for juice bars near the gym are likely to be of value to the user, regardless of whether the user has visited that particular gym previously. As a further example, if at 1 pm the routine model is used to predict that a user will pass by a restaurant at 7 pm, the restaurant's takeout menu could be presented as a possible dinner option. In contrast, if the user is currently close to the restaurant, presenting the user with the restaurant's current lunch specials is probably of greater value.

The routine module 610 processes the slices in the user's history to create a collection of transitions. A transition is defined as a change from one context to another. A transition has a source (the starting context) and a destination (the following context). Like contexts, transitions can have varying degrees of specificity, semantic content, and likelihood. For example, a user's night out could be described by any (or all) of the following transitions: dinner followed by a movie, Joe's Pizza followed by Regal Theaters, the Capitol Hill neighborhood followed by the University neighborhood. The routine module 610 can therefore record many possible transitions (with associated probabilities) to account for a segment of observed behavior. Thus, the series of contexts included in the slices of a user's history also define a collection of transitions.

Embodiments of the invention use the following process to build a routine model for a user based on that user's sequence of historical slices.

Split the slice sequence into subsequences whenever adjacent slices are too far apart in time (e.g., greater than three hours).

Filter out any slice not meeting certain quality criteria. For example, by filtering out stays of duration less than five minutes, stays supported by too few observations, and/or stays with low probability.

Iterate through the slices. Create transition pairs between contexts for the current slice and contexts from a previous slice within some history window (a larger window allows a wider range of data, but can be much more expensive to compute as many more transition pairs become possible). The context from the previous slice is the source of the transition, and the context from the current slice is the destination.

Keep count of how often each context and each transition pair occurs over time. Using these counts, compute the probability of each destination given each source, i.e., the probability of various transitions.

Create and store transition rules for the user, each transition rule comprising a source context, a destination context, and a corresponding probability that the user will make a transition from the source to the destination.

The result of this process is an incrementally-updated routine model for the user consisting of a collection of transition rules, each with a source context, a destination context, and a probability. For example, imagine a segment of a user's history that involves three slices: a stay at a coffee shop in Bellevue, travel from Bellevue to Seattle, and a stay at the user's workplace in Seattle. The first slice might include contexts like "location=Bellevue", "venue=Joe's Café", "type=coffee shop", and "time=morning". The second might include "location=Bellevue to Seattle" and "activity=driving". The third might include "activity=working", "location=Seattle", and "location=456 Spring St." The routine module 610 can generate a number of transitions from this data and add them to the user's routine model. Examples include a transition from "time=morning" to "activity=working", a transition from "type=coffee shop" to "activity=driving", a transition from "location=Bellevue" to "location=Seattle", and a transition from "location=Bellevue" to "location=456 Spring St." Note that, because the system is less certain that the third slice was at 456 Spring St. than that it was in Seattle (because Seattle is larger and easier to identify than a specific address), the "456 Spring St." transition would have lower probability than the "Seattle" one.

Furthermore, the location module 111 might have been uncertain whether the user was at Joe's Café or Barbara's Bagels next door (e.g., due to the noise in position data), assigning a higher probability to Joe's. In one embodiment, transitions for both Joe's and Barbara's are generated and added to the routine model, with the corresponding probability for Joe's being higher than that for Barbara's. In other embodiments, the routine module 410 considers only the most likely interpretation of the data, only transitions that exceed a threshold probability. In further embodiments, contexts are filtered according to combinations of these approaches.

For simplicity, the source of a transition rule has been described above as a single context. However, transitions rules can have sets of contexts as sources, allowing non-Markovian transition rules. For example, a rule could encode that when a user goes to the Capitol Hill neighborhood followed by the University District neighborhood, the user then has a high probability of visiting the Fremont neighborhood. The source in this example consists of a sequence of two contexts, for the two neighborhoods.

In one embodiment, the contextual information provider 140 represents users' general preferences using transition rules. For example, a general love of antique shops is represented by a transition rule where the source is the null context (i.e., anywhere, any time) and the destination is the antique shop category. Thus, the contextual information provider 140 can manage a user's general preferences by including such transition rules in the user's routine model, and these preferences can inform the selection of information items (e.g., a user with a love of antiques may be interested to be provided with information about the items on display in a local museum) and modify the weights assigned to information items during the selection process.

In one embodiment, the routine module 610 stores the routine model in user model storage 650 for future further processing and/or use by the information selection module 630 in selecting information items for presentation. In other embodiments, a user's routine model can be stored elsewhere, such as on the user's mobile device, which provides information from the model as required.

Modeling User Personality

The personality module 620 takes a user history comprising slices as input and generates a model describing the user's personality. The goal of the user personality model is to provide a better understanding of the user in general terms (rather than tracking specific preferences) and use that to guide the selection of information items to be presented to the user. Much research has been done on the problem of categorizing, detecting, and understanding personality types. Examples include Jung's "Psychological Types", the Myers-Briggs Type Indicator derived from it, Enneagrams, and others. The aim of these approaches is to provide a system for exhaustively describing personality types along with a method to determine a person's type, typically based on an interview or survey. Similarly, embodiments of the personality module 620 use plurality of personality traits (dimensions) and determine an estimate for the user's affinity with that trait. In one such embodiment, this process is automated (requiring no human interpretation), and nonintrusive (e.g., avoiding explicit survey questions).

A specific representation of user personality and method of characterization that is well-suited to use by the personality module 620 is described below. However, the techniques described below are equally applicable to other personality representations, such as those mentioned above or others that may be devised.

The context refiner module 120 outputs slices indicating historical contexts associated with a user. The personality module 620 processes the slices and builds a personality model for the user based on the user's historical contexts. In one example, the personality module 620 builds a personality model for the user that indicates the user's affinity with various personality traits, which can be used by the system to select an information item to present based on the user's personality traits indicating high likelihood of interest in the selected information item. For example, if the user's personality model indicates an affinity for social activities, the model built by the personality module 620 may cause the system to select comments made by the user's friends regarding bars and clubs in the user's vicinity as information items for presentation. If the user's personality model indicates an affinity for outdoor activities, the model built by the personality module 620 may cause the system to provide information regarding events in parks in the user's vicinity, or even to provide a menu and opening times for a restaurant that is adjacent to a particularly scenic overlook.

The personality module 620 represents each personality trait as a position on a personality dimension, ranging from not exhibiting the trait in question at all, to completely exhibiting the trait at all times, with most people falling somewhere in the middle. Thus, a given user will be evaluated as having a score (e.g., from 0% to 100%) for each dimension. In one embodiment, the following dimensions are used:

Desire for novelty: how often the user chooses to try new, unfamiliar experiences as opposed to sticking with the tried and true. For example, a person with a high novelty preference will often try new restaurants in an area, even if they might not be as good as a nearby familiar favorite.

Extravagance: how often the person is willing to indulge in expensive products or experiences.

Preference for proximity: to what extent the person prefers spending time near to home or other frequently-visited places like his workplace, rather than traveling long distances. Proximity can alternatively be stated as its inverse, willingness to travel.

Love of the outdoors: how often the person prefers outdoor activities when available.

Preference for physical activity: how much the user prefers physically active as opposed to sedentary activities.

Desire for solitude: how often the person prefers solitary activities as opposed to social ones.

In other embodiments, the personality module 620 uses different and/or additional personality dimensions. Any aspect of personality can be used in the personality model, as long as (1) it is known how to test for that trait in people (e.g. using survey questions); and (2) it is known how to map the trait to useful features in an application of the system. The exemplary embodiment described uses only personality traits closely related to the task of recommending places to go, but other types of traits can be used. For example, in one embodiment, Myers-Briggs traits are used to learn where users stand on dimensions including extroversion/introversion and thinking/feeling. Another embodiment learns personality traits including tastes in books, movies, and other entertainment and thus is able to determine correlations between activities that are not obviously linked. For example, one such personality model can predict whether a person who likes a certain type of movie will enjoy going to a certain restaurant.

As with other personality approaches (e.g., Myers-Briggs), the example personality dimensions described above can be determined for a person by asking them to answer a questionnaire. Such questionnaires typically pose binary choices such as "would you rather visit a library or a bar?" By asking many of these questions, general tendencies can be determined such as 'desire for solitude' or 'love of the outdoors.' However, in order to determine users' personality traits without having to administer an intrusive and tedious questionnaire, embodiments analyze the behavior data collected by the system to automatically determine the personality traits.

In one embodiment, the personality module 620 is initialized using a baseline user group. Thus, when the system is used by an end user, it has already been trained and can immediately provide meaningful information items. In one embodiment, the following general algorithm is used to initialize the personality module 620:

Recruit a baseline user group.

Administer a personality questionnaire to each member of the baseline user group, thus determining their personality dimensions.

Record behavior data for the baseline user group as they go about their everyday lives (e.g., using the system described herein) and encode the collected behavior data as a set of features.

Encode the collected data as a series of classification problems, where each member of the baseline group is a data point, the corresponding behavior data are the features, and each member's place on a personality dimension is the classification to be learned.

Use machine learning algorithms to develop a model that can predict the position in each personality dimension of any given user based on the behavior data of that user.

The above generalized algorithm can be realized in a number of ways. One embodiment is described herein as an illustration. AMAZON's "Mechanical Turk" product is a way to recruit and pay users. A task is created in Mechanical Turk that asks users for (1) authorization to their FOURSQUARE data; and (2) answers to a number of binary-choice personality questions.

FOURSQUARE is a service that encourages users to "check in" to places they visit. Users can see other users' tips about those places, receive special deals from businesses they check in to, and earn "badges" for checking into various kinds of places. FOURSQUARE provides an approximation of the user's behavior. Thus, FOURSQUARE provides a good source of data to use as some or all of the baseline group behavior data. While such behavioral data is not as complete as information collected by the system described herein, since users do not check in everywhere they go and do not indicate how long they stayed, it allows the collection of behavior data from many existing users without having to recruit people to use a new application for days or weeks.

The personality questionnaire given to the baseline user group comprises binary-choice questions, as described above, which pose a number of choices intended to elicit information about the user's preferences. By asking enough questions (e.g., 20 questions, but more or fewer may be asked), it can be determined where the user stands on the personality dimensions to be used. The Foursquare history of each baseline user group member can be used to personalize the questions asked—the corresponding FOURSQUARE histories reveal the city each member lives in, the neighborhoods they spend time in, and specific places they have been. Thus, the questions posed to each member can relate to real places around the member, and be tailored to test traits such as novelty and proximity that are dependent on the member's behavior over a period of time. For example, determining a member's affinity for novelty requires not just knowledge that the member has visited a particular restaurant, but also whether the user has previously visited that restaurant. Other traits can determined based on general data about places visited by the member. For example, the member's affinity for outdoor activities can be influenced by identifying a visit to a park, regardless of past behavior.

Once behavior data and personality data from the baseline user group has been collected, it is encoded to be fed to a learning algorithm. Each member's behavior is represented as a series of visits, each identifying features of the visit that are relevant to the personality traits that the system is attempting to learn. For example, in the embodiment currently being described, each visit to a place is encoded by the following features:

Category. E.g., restaurant, Chinese restaurant, park, office, and the like. Note that places may have multiple classifications, and that the categories are hierarchical—multiple categories are encoded, and include the "ancestor" categories as well (e.g. "restaurant" is an ancestor of "Chinese restaurant").

Distance. Based on the member's history, one or more "home areas" are identified where the member spends a great deal of time. Typically, these would represent home and work neighborhoods. For each place, the distance to the nearest home area is computed. Also, the distance from the previous place in the history is recorded, if they are close enough in time (to track how far the member is willing to travel from place to place).

Familiarity. How often the member has been there before.

Price range. Many local data sites (such as YELP, or CITYSEARCH) already encode this data, for example on a scale from 1 to 4.

Once the visits are encoded, summary statistics about the corresponding features can be computed for each member of the baseline group. Most members' data will be dominated by the time they spend at home and work, so counting these visits could confuse some personality traits. For example, if one counts home and work, most people will probably be seen to visit familiar locations most of the time. Thus, by identifying these special places and excluding them from certain statistics (or giving them reduced weighting), visits to such places are prevented from dominating the analysis. In one embodiment, the computed statistics include:

Category frequency. For each category, how often the member goes there. Home is excluded.

Distance. Median, mode, mean, and standard deviation of distance from visited places to the nearest home area are included as well as distance to the previous place, if applicable. Home and work are excluded.

Familiarity. Median, mode, mean, and standard deviation of the number of previous visits are computed. Home and work are excluded.

Price. Median, mode, mean, and standard deviation of price for places that have price information are computed, excluding home and work.

Home. The proportion of home visits to total visits, and average number of home visits per day are computed.

Work. As with home, proportion of work visits and average work visits per day are computed.

Note that in this embodiment, no explicit features pertain to outdoors, solitude, or activity; these features are inferred from the place categories. Rather than trying to hand-code a mapping from categories to these traits, the learning algorithm discovers them.

Once each member is encoded as a set of features and a set of personality classifications has been determined, standard machine learning algorithms can be applied to learn a model that predicts the latter from the former. Each personality dimension is treated as an independent class to be learned. The result of this process is a predictive model for each personality dimension; the models take the above computed statistics as input and output estimates of a user's affinity with each personality trait. Thus, the personality module 620 has been initialized using the baseline user group. Once the personality module 620 has been initialized, an end user's history can be used to predict the user's personality, without the need for the end user to explicitly provide data. For example, by feeding the history of the end user into the personality module 620, the above statistics can be computed and the predictive model used to generate a personality model for the end user, without requiring the end user to complete a survey, or actively provide personality data in any other manner.

In one embodiment, the personality module 620 stores the personality model in user model storage 650 for future further processing and/or use by the information selection module 630 in selecting information items for presentation. In other embodiments, a user's routine model can be stored elsewhere, such as on the user's mobile device, which provides information from the model as required.

As described previously, general preferences can be incorporated into the user's routine model by creating transition rules with the null source. Similarly, personality traits can be represented by a transition rule with a null source. For example, a preference for solitary activities can be represented by a transition from the null source to a "solitary" context. Information items can be associated with particular personality traits, and these associations with traits become additional factors that can be used when selecting information items for presentation to a user. In one embodiment, some traits, such as extravagance and outdoors are computed from available venue metadata, and are thus the same for all users. Other traits, like novelty and proximity are determined from information about the user's history and location (e.g., a venue is considered novel if the user's history does not include a previous visit to the venue) and can thus differ from user to user. In other embodiments, these attributes are determined for venues and events in various other and/or additional ways.

Selecting Information Items

The information selection module 630 takes the end user's current context(s) and information about the user's interests as input and outputs one or more information items that are customized for the end user. In various embodiments, the information about the user that is used as input is a user behavior model based on the end user's routine model, personality model, and/or additional data describing the end user and his/her interests.

At a high level, the information selection module 630 is a system for selecting information items to present to a user that is capable of adapting itself to the particular user's preferences and needs. This definition refers to how the system is presented to the user and is not intended to imply how the module is implemented. For example, some systems may select certain information items to present to a group of users (e.g., severe weather warnings, paid advertisements, etc.) regardless of the user's preferences and interests, but the visible user interface presents those information items in the same manner as those information items that were selected in a customized manner. In one embodiment, the information selection module 630 is located at a recommendation service provider server and sends (e.g., via the internet) information items to the end user's mobile device for presentation. In another embodiment, the information selection module 630 executes on the end user's mobile device using data from local storage and/or accessed remotely via a network. For example, the user's routine and personality models may be stored locally while the contextual information corpus 660 may be stored at one or more servers and accessed remotely.

Updating Users' Models

One limitation of many information provider systems is that they have trouble determining when a particular observation should or should not influence the general model of a user's preferences. For example, a user may be observed to drive home from work at 5 pm on weekdays, unless the user has a tennis match, in which case the user instead drives to a local tennis club. An information provider system with no concept of context or routine will be likely to present the user with traffic information regarding the route home on weekdays, regardless of whether the user had a tennis match, which is of little value to the user and clutters up the information stream, making the user less likely to use it. The system described herein addresses this issue by learning that the drive home from work occurs only in certain contexts: when the user is at work, and when it is approaching 5 pm, and when the user does not have a tennis match. When the user has tennis matches can be determined in various ways, such as by inspecting the user's calendar, prompting the user as to when there are matches scheduled, and the like. Thus, the system is far less likely to recommend traffic information for a journey the user is not intending to make in the near future. Note, however, that it is too simple to say the user is not interested in traffic information regarding the journey home from work; in fact, the user is highly interested in this information in certain circumstances, and the system has learned this.

In order to address this, the feedback module 640 collects feedback regarding information items presented to the end user and uses that feedback to update the end user's models. A variety of feedback can be collected from end users in order to improve the models used by the information selection module 630. In some embodiments, the information selection module 630 stores additional information about user preferences in user model storage 650 to encode the received feedback in a manner appropriate for user in later information item selection. In one such embodiment, a preference for a certain type of information item is stored in association with an identifier of a user in response to the user explicitly stating an interest in the information item type. For example, if the user regularly accepts information items containing venue reviews written by friends, this interest in reviews by friends can be stored and the system will be more likely to select other reviews written by friends in the future. Similarly, a lack of interest in a certain type of information item is explicitly indicated and stored, reducing the probability (or completely ruling out) such information items being presented to the user in future. For example, if the user rejects (or ignores) multiple traffic information items, this lack of interest can be recorded and the system will not select traffic information items for presentation in the future.

At a high level, feedback can be categorized as either explicit or implicit. Explicit feedback is any information deliberately provided by the end users about their preferences or the quality of an information item that was presented to them. In various embodiments, several forms of explicit feedback are collected and used to improve the user models.

First, end users can explicitly express a preference in favor of information items anywhere they see them in the recommendation system's user interface (UI), for example by selecting a button associated with the information item in the UI. This includes at the time the information is initially provided. The feedback module 640 can use this feedback directly, for example by favoring the provision of similar information in an appropriate context. Furthermore, the feedback module 640 can determine how the information item aligns with the end user's personality traits and adjust the weights of those traits in the end user's personality model accordingly. For example, if information about highly social venues such as bars is frequently rejected whereas information about more solitary venues is accepted, the system may increase its estimate of the user's affinity for solitude. Similarly, if information items about venues that are near the user's current vicinity (or near one of the user's common locations, such as home and work) are often examined eagerly (whether confirmed or rejected) while information items about far-away venues are generally ignored, the system might increase its estimate of the user's affinity for proximity. In various embodiments, an information item is considered to have been eagerly examined if the user views the recommendation shortly after receiving it (e.g., within five minutes) and/or views it for a significant amount of time (e.g., if the information item remains displayed for more than ten seconds). In one embodiment, gaze tracking is used to determine whether a user is actually examining a displayed information item, or merely left it displayed while looking elsewhere.

Second, end users can explicitly accept or reject the reasons associated with presented information items. Reasons describe the system's justifications for selecting a particular information item, and can be determined by information item attributes (e.g., it's popular or highly rated, it's of a type you've found useful in the past, etc.), by context (e.g., it relates to something nearby, your routine suggests you will be near something it relates to later, it is related to your current activity), or by personality traits (e.g., it relates to outdoor activities). By liking or rejecting these reasons for presenting an information item, end users tell the system to give more or less weight to the corresponding features and contexts when selecting information items to present in future. Thus, the feedback module 640 adjusts the weights of those factors accordingly. For example, a user might have a to-do list that includes the item "get milk" while the user's routine model indicates that she tends to complete items on to-do lists while on the way home from work. If the user's route home takes her near to a grocery store, the system may present an information item regarding the availability of milk at the grocery store with the reasons "get milk is on your to-do list" and "you often complete items on your to-do list on the way home from work." If the user accepts the former, but rejects the latter, the weightings in the user behavior model are adjusted such that selecting information items relating to items on to-do lists is generally more likely in future, but selecting such information items is less likely when the user is on her way home from work.

Third, end users can reject presented information items, requesting that the information item (or similar information items) not be shown again. In some embodiments, the feedback module 640 uses this information to adjust the weights of corresponding aspects of the user's personality and/or routine model to reduce the probability of similar recommendations in the future. For example, a user may be presented with information about activities occurring in a park at a time the user is predicted to be near the park and given the reasons "you like outdoor activities" and "you will be near this park at this time." The user may reject the information, indicating agreement with the statement "you like outdoor activities" but rejecting "you will be near the park at this time." In response, feedback module 640 updates the user's routine model to reflect the incorrect prediction that the user will be near the park and updates the user's personality model to reinforce the fact that the user enjoys outdoor activities.

Fourth, users can answer questions about their preferences and experiences. The feedback module 640 can create questions that probe user preferences in various ways. One example is a "this or that" question, which asks users to choose between two possible information items. The information items are chosen as examples of opposing preferences (e.g. extravagant vs. thrifty, solitary vs. social, Chinese vs. Mexican food, detailed information vs. brief summaries), and each question answered provides a small piece of evidence regarding the user's preferences. Other questions include asking whether the user found a particular piece of information useful, asking them to choose between two activities (e.g. dinner and a movie vs. drinks and dancing), and other personality questions as described above.

Implicit feedback is any information collected about the user's preferences based on actions the user takes for other purposes. In various embodiments, several forms of implicit feedback are used to refine the information selection process.

First, if the user makes use of an information item when it is presented, this can be interpreted as a very strong endorsement of the recommendation's suitability for the user in the user's current context. For example, if the user is presented with information indicating a crash on the user's usual route home, and is observed to take a different route home that avoids the crash, the feedback module 640 can infer that the information was useful to the user. Correspondingly, in one embodiment, the feedback module 640 reinforces the factors used to select the information item in the corresponding routine and/or personality models.

Second, whether or not the user immediately makes use of a presented information item, the user may eventually act on it. For example, if the user is presented with a menu for a local restaurant at lunch time on a Monday, and is observed to be at the restaurant for dinner the following Saturday night, this provides evidence that the information item was a good one for that user, even though the user may have made use of the information for reasons other than those that led the system to recommend it. Correspondingly, in one embodiment, the feedback module 640 reinforces the factors used to select the information item in the corresponding routine and/or personality models, but by a lesser amount than if the user made use of the information immediately after being presented with it.

In some embodiments, the feedback module 640 incorporates feedback that indicates a user's preferences or affinity for a particular type of recommendation by adding null-source transition rules to the model or models used by the information selection module 630. The feedback module 640 weights updates determined from user feedback relative to updates from observed slices. For example, if the user is presented with information about activities available in a local park and then visits the park, a "null to park" rule is updated in the model to make the presentation of future information relating to that park, and of parks in general more likely. If the user then provides explicit positive feedback for the information item, the system may count the feedback as equal to a visit or worth more or less weight than the visit itself. In one such embodiment, explicit feedback is weighted to be equivalent to multiple observations (e.g., 10), because (1) explicit feedback is known to be correct (whereas observations may be wrong); and (2) the fact that the user bothered to provide feedback indicates that the information was of particular value to them.

Exemplary Method of Providing Contextual Information

Figure 7:
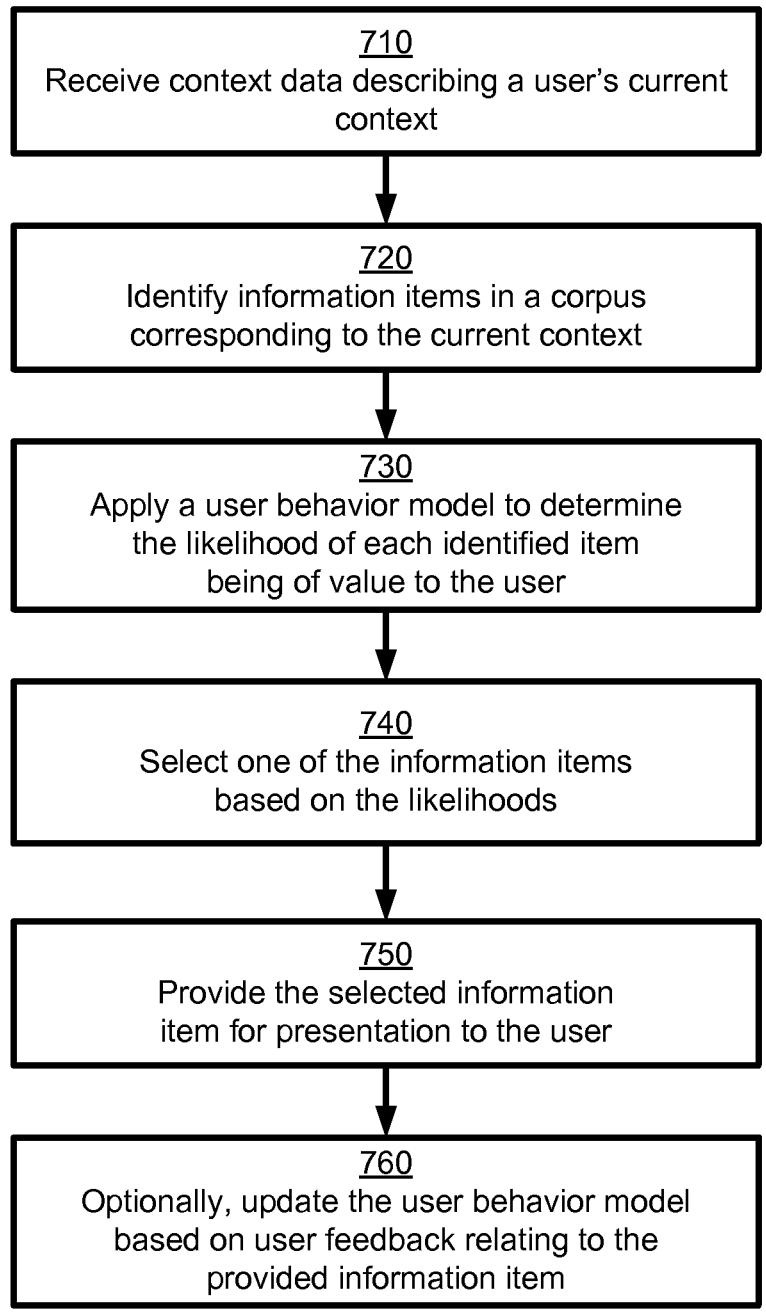
FIG. 7 is a flow chart illustrating a method of providing contextual information to a user based on a model describing the user's behavior, according to one embodiment.

FIG. 7 illustrates a method of providing contextual information to a user based on a model describing the user's behavior, according to one embodiment. The steps of FIG. 7 are illustrated from the perspective of the contextual information provider 140 performing the method. However, some or all of the steps may be performed by other entities and/or components. In addition, some embodiments may perform the steps in parallel, perform the steps in different orders, or perform different steps.

In the illustrated embodiment, the method begins with the recommendation agent module 140 receiving 710 context data describing the user's current context, such as that produced by the context refiner module 120. The contextual information provider 140 then identifies 720 information items in the contextual information corpus 660 that corresponds to the user's current context. In one embodiment, the contextual information provider 140 searches the contextual information corpus 660 for all information items that correspond to a location within a threshold distance (e.g., within a radius of one mile) of the user's current location. In another embodiment, the contextual information provider 140 applies the user's routine model to the context data to predict likely future location (and optionally other contexts, such as activity) for the user. The contextual information provider 140 then searches the contextual information corpus 660 for information items relevant to the predicted future contexts, such as all items within one mile of the predicted future location. In some embodiments, the contextual information provider filters the identified information items using context data other than location data. For example, if the user's current context includes that it is currently nighttime; the contextual information provider 140 can remove any information items in the vicinity that are only relevant during the day.

After identifying 720 the information items in the corpus that correspond to the current context, the contextual information provider 140 applies 730 a user behavior model to determine the likelihood of each identified information item being of value to the user. As described above with reference to FIG. 6, the user behavior model can include elements of the user's routine model and/or personality model, as well as additional information regarding the user's interests and preferences, depending on the specific embodiment.

In various embodiments, the likelihood of value assigned to an information item is a score, e.g., a percentage, with 100% indicating the user will definitely be interested in the information and 0% indicating the user will definitely have no interest in the information, with information items generally falling somewhere in between. In one such embodiment, where the information items are selected based on the user's current context, the score is computed as a function of a plurality of factors, including: how recent the information item is (e.g., a newly updated menu is scored higher than one that is over a year old), how recently the user entered the current context (e.g., information items in a neighborhood are scored higher if the user just entered the neighborhood than if the user has been there all day), and how closely the information is connected to the individual user (e.g. reviews from a friend are scored higher than those from strangers). In another such embodiment, where the information items are selected based on a predicted future context for the user, each information item is given a score computed as a function of a plurality of factors, including: how recent the information is, how closely the information is connected to the individual user (e.g. reviews from a friend are scored higher than those from strangers), and the probability of the prediction of the future context being accurate. For example, traffic information on a Monday morning would score highly because it is updated often, it pertains to the user's own commute route, and the user's routine model indicates the user is highly likely to leave for work soon. In other embodiments, other measures of the likelihood of value are used.

Next, the contextual information provider 140 selects 740 one of the information items based on the determined likelihoods. In one embodiment, the contextual information provider 140 selects the information item with the highest likelihood. In another embodiment, the contextual information provider 140 assigns a probability of selection to each possible information item based on the corresponding likelihoods and selects from among them using a random number generator. In further embodiments (not shown), more than one of the information items is selected. For example, the contextual information provider 140 may select the five information items with the five highest likelihoods.

Having selected 740 the information item (or items), the contextual information provider 140 provides 750 the selected information item for presentation to the user. In one embodiment, the contextual information provider 140 runs on the user's mobile device, which then presents the information item to the user. For example, the recommendation can be presented visually and/or audibly by a dedicated app executing on the user's mobile device. In another embodiment, the contextual information provider 140 is implemented at a contextual information service provider's server, which provides 750 the information item by sending it to the user's mobile device for presentation. For example, the information item can be sent to a dedicated app via the Internet, sent via SMS text message, sent via multimedia message, and the like.

In one embodiment, the contextual information provider 140 includes one or more reasons with the selected information item, explaining why the information item was selected, which is presented in conjunction with the information item. For example, in the example of a user who usually drives home from work at 5 pm on weekdays used earlier, the reasons provided along with traffic information for the route home could include "You usually drive home at this time." If the user has been previously observed to avoid heavy traffic when presented with traffic warnings, the reasons could also include "you have previously adjusted your route to avoid reported heavy traffic."

In some embodiment, the user's behavior model is updated 760 based on how the user responds to the selected information item. As described above with reference to the feedback module 640 of FIG. 6, both implicit and explicit feedback regarding the user's response to information items provides additional information about the user's routine, personality, and interests. Therefore, this feedback can be used to continuously improve the user's behavior model and, consequently, the relevance of the information items provided in future.

ADDITIONAL CONFIGURATION CONSIDERATIONS

A computer is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on a storage device, loaded into memory, and executed by a processor.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method of providing contextual information to a user, comprising:
   receiving context data describing the user's current context;
   identifying a plurality of information items corresponding to the user's current context;
   applying a personalized user behavior model for the user to determine, for each of the plurality of information items, a likelihood that the information item will be of value to the user, the user behavior model including a routine model describing correlations between contexts, the routine model comprising a plurality of transition rules;
   selecting an information item from among the plurality of information items based on the corresponding likelihood;
   providing the selected information item for presentation to the user;
   receiving feedback indicating the user found value in presentation of the selected information item;
   identifying a contributing transition rule from among the plurality of transition rules based on the contributing transition rule having contributed to selection of the selected information item, the contributing transition rule comprising a source context and a destination context; and
   storing an indication that the user found value in presentation of the selected information item in conjunction with the contributing transition rule such that information items associated with the destination context are in future determined to have a higher likelihood when the user is associated with the source context.

2. The method of claim 1, wherein the context data includes an indication of at least two of: a current location of the user, a current time, and a current activity of the user.

3. The method of claim 1, wherein identifying a plurality of items corresponding to the user's current context comprises:
   determining a location of the user from the contextual data;
   determining a distance between the location of the user and a location corresponding to a first information item in a corpus; and
   including the first information item in the plurality of information items responsive to the distance being less than a threshold.

4. The method of claim 1, wherein identifying a plurality of items corresponding to the user's current context comprises:
   applying the routine model to the user's current context to predict a likely future location for the user;
   determining a distance between the likely future location and a location corresponding to a first information item in a corpus; and
   including the first information item in the plurality of information items responsive to the distance being less than a threshold.

5. The method of claim 1, wherein identifying a plurality of items corresponding to the user's current context comprises:
   applying the routine model to the user's current context to predict a likely future context for the user;
   comparing the likely future context to a first context associated with a first information item in a corpus; and
   including the first information item in the plurality of information items responsive to a correspondence between the likely future context and the first context.

6. The method of claim 1, wherein the routine model describes correlations between contexts and comprises a transition rule including a source context and a destination context, the likelihood of a given information item being of value being based on both the source context corresponding to the user's current context and the destination context corresponding to the given information item.

7. The method of claim 1, wherein the user behavior model further comprises a personality model comprising a plurality of metrics indicating the user's position on a corresponding plurality of personality dimensions, the likelihood of a given information item being of value based on a correspondence between the plurality of metrics and the given information item.

8. The method of claim 1, further comprising:
updating the user behavior model responsive to the feedback such that information items of a same type as the selected information item are in future determined to have a higher likelihood of value to the user.

9. The method of claim 1, wherein the user behavior model comprises a personality model comprising a plurality of metrics indicating the user's affinity with a corresponding plurality of personality traits, the method further comprising:
identifying one or more contributing personality traits from among the plurality of personality traits based on the contributing personality traits having contributed to selection of the selected information item; and
increasing the user's affinity with the contributing personality traits in the personality model.

10. A non-transitory computer-readable storage medium comprising executable computer program code for providing contextual information to a user, the computer program code comprising instructions for:
receiving context data describing the user's current context;
identifying a plurality of information items corresponding to the user's current context;
applying a personalized user behavior model for the user to determine, for each of the plurality of information items, a likelihood that the information item will be of value to the user, the user behavior model including a routine model describing correlations between contexts, the routine model comprising a plurality of transition rules;
selecting an information item from among the plurality of information items based on the corresponding likelihood;
providing the selected information item for presentation to the user;
receiving feedback indicating the user found value in presentation of the selected information item;
identifying a contributing transition rule from among the plurality of transition rules based on the contributing transition rule having contributed to selection of the selected information item, the contributing transition rule comprising a source context and a destination context; and
storing an indication that the user found value in presentation of the selected information item in conjunction with the contributing transition rule such that information items associated with the destination context are in future determined to have a higher likelihood when the user is associated with the source context.

11. The non-transitory computer-readable storage medium of claim 10, wherein the context data includes an indication of at least two of: a current location of the user, a current time, and a current activity of the user.

12. The non-transitory computer-readable storage medium of claim 10, wherein identifying a plurality of items corresponding to the user's current context comprises:
determining a location of the user from the contextual data;
determining a distance between the location of the user and a location corresponding to a first information item in a corpus; and
including the first information item in the plurality of information items responsive to the distance being less than a threshold.

13. The non-transitory computer-readable storage medium of claim 10, wherein identifying a plurality of items corresponding to the user's current context comprises:
applying the routine model to the user's current context to predict a likely future location for the user;
determining a distance between the likely future location and a location corresponding to a first information item in a corpus; and
including the first information item in the plurality of information items responsive to the distance being less than a threshold.

14. The non-transitory computer-readable storage medium of claim 10, wherein identifying a plurality of items corresponding to the user's current context comprises:
applying the routine model to the user's current context to predict a likely future context for the user;
comparing the likely future context to a first context associated with a first information item in a corpus; and
including the first information item in the plurality of information items responsive to a correspondence between the likely future context and the first context.

15. The non-transitory computer-readable storage medium of claim 10, wherein the routine model describes correlations between contexts and comprises a transition rule including a source context and a destination context, the likelihood of a given information item being of value being based on both the source context corresponding to the user's current context and the destination context corresponding to the given information item.

16. The non-transitory computer-readable storage medium of claim 10, wherein the user behavior model further comprises a personality model comprising a plurality of metrics indicating the user's position on a corresponding plurality of personality dimensions, the likelihood of a given information item being of value based on a correspondence between the plurality of metrics and the given information item.

17. The non-transitory computer-readable storage medium of claim 10, the computer program code further comprising instructions for:
updating the user behavior model responsive to the feedback such that information items of a same type as the selected information item are in future determined to have a higher likelihood of value to the user.

18. The non-transitory computer-readable storage medium of claim 10, wherein the user behavior model comprises a personality model comprising a plurality of metrics indicating the user's affinity with a corresponding plurality of personality traits, the computer program code further comprising instructions for:
identifying one or more contributing personality traits from among the plurality of personality traits based on the contributing personality traits having contributed to selection of the selected information item; and
increasing the user's affinity with the contributing personality traits in the personality model.

19. The method of claim 1, wherein the feedback is implicit feedback, the implicit feedback being information collected about the user's preferences based on actions the user takes for purposes other than providing feedback regarding presentation of the selected information item.

20. The method of claim 1, wherein the feedback comprises an indication that the selected information item was displayed for more than a threshold amount of time.

21. The method of claim 1, further comprising:
using gaze tracking to determine an amount of time for which the user examined the selected information item,
wherein the feedback comprises an indication that the amount of time for which the user examined the selected information item is greater than a threshold amount of time.

22. The non-transitory computer-readable storage medium of claim 10, wherein the feedback is implicit feedback, the implicit feedback being information collected about the user's preferences based on actions the user takes for purposes other than providing feedback regarding presentation of the selected information item.

23. The non-transitory computer-readable storage medium of claim 10, wherein the feedback comprises an indication that the selected information item was displayed for more than a threshold amount of time.

24. The non-transitory computer-readable storage medium of claim 10, the computer program code further comprising instructions for:
using gaze tracking to determine an amount of time for which the user examined the selected information item,
wherein the feedback comprises an indication that the amount of time for which the user examined the selected information item is greater than a threshold amount of time.

* * * * *